3,847,959
PROCESS OF PREPARING A ZEROVALENT NICKEL COMPLEX WITH ORGANIC PHOSPHORUS COMPOUNDS

Howard E. Shook, Jr., Orange, Tex., and John B. Thompson, Wilmington, Del., assignors to E. I. du Pont de Nemours and Company, Wilmington, Del.
No Drawing. Filed Oct. 25, 1972, Ser. No. 300,823
Int. Cl. C07f 15/02
U.S. Cl. 260—439 R                 12 Claims

ABSTRACT OF THE DISCLOSURE

A zerovalent nickel complex of an organic triaryl phosphorus compound is prepared by dissolving nickel chloride in an organic nitrile by contacting the nickel chloride with a zinc halide in a mole ratio based on nickel chloride to be dissolved of at least 2, and a triaryl phosphorus compound such as a triaryl phosphite, agitating the reaction mixture at a temperature in the range of 25–140° C. to effect solution of the nickel chloride in the reaction medium; and thereafter introducing a finely divided reducing metal such as zinc and maintaining the reaction mixture at a temperature in the range of 60–115° C. to form the zerovalent complex of the triaryl phosphorus compound. Optionally, the triaryl phosphorus compound can be withheld from the step of solubilizing the nickel chloride and introduced prior to or along with the reducing metal.

BACKGROUND OF THE INVENTION

This invention is concerned with the preparation of zerovalent nickel complexes of triorganophosphites which are especially useful as catalysts in the hydrocyanation of olefins.

A number of methods have been described for the preparation of zerovalent complexes with organic phosphorus compounds. The preparation of such complexes by reaction of a nickel carbonyl with a triorganophosphite is found in U.S. Pat. 3,328,443. The preparation of similar complexes by reacting a triorganophosphite with an organonickel compound is described in U.S. Pat. 3,152,158. A preparation involving the reduction of a nickel compound with a reducing metal in the presence of a triorganophosphite is described in Belgian Pat. 621,207; a similar preparation carried out in the added presence of 3-pentenenitrile is disclosed in application Ser. No. 729,882, filed May 18, 1968 by M. O. Unger and A. W. Anderson and now abandoned. Reduction of a divalent nickel compound in a saturated organic dinitrile solvent to produce the zerovalent complex substantially free of by-product, zinc chloride, is described in U.S. Pat. 3,631,191.

For large-scale manufacturing operations preparative methods more rapid than the methods described above and affording higher conversions are desired.

SUMMARY OF THE INVENTION

An improved process of preparing zerovalent nickel complexes of organic phosphorus compounds has now been found which involves a first step, contacting nickel chloride with an organic nitrile, a triaryl phosphite and a zinc halide, the halide being present in a mole ratio based on nickel chloride to be dissolved of at least 2, and agitating the reaction mixture at a temperature in the range of 25 to 140° C., preferably 70–140° C. to form a solution of the nickel halide in the reaction mixture. Thereafter the dissolved nickel chloride is contacted with a finely divided reducing metal such as zinc at a temperature in the range of 60–115° C., preferably 60–80° C. to form the zerovalent nickel complex of the triaryl phosphite. A particular advantage of the process is that the zerovalent nickel complex is formed rapidly from the solubilized nickel compound and the conversion is accomplished at a relatively mild temperature, thus tending to reduce the formation of undesired by-products.

The zerovalent nickel complexes that can be produced by the method of this invention include those of the formula $NiL_4$ where L is a sigma pi bonding neutral ligand represented by $PZ_3$. In $PZ_3$, Z is OR and R is an aryl group having up to 18 carbon atoms. The Z groups may be the same or different and may be cojoined. Typical trivalent phosphorus compounds corresponding to $PZ_3$ include triphenyl phosphite, tri-$m$-tolyl phosphite, tri-$p$-tolyl phosphite and mixed tri-$m$ and $p$-tolyl phosphites among which the mixed tri-$m$ and $p$-tolyl phosphites are preferred. The $PZ_3$ ligands described above are particularly suited for the preparation of zerovalent complexes of the type $NiL_4$. Illustrative of these are $Ni[P(OC_6H_5)_3]_4$, $Ni[P(O\text{-}m\text{-}C_6H_4CH_3)_3]_4$, $Ni[P(O\text{-}p\text{-}C_6H_4CH_3)_3]_4$ and $Ni[P(O\text{-}m\text{-} \text{ and } p\text{-}C_6H_4CH_3)_3]_4$.

Other zerovalent nickel complexes which can be produced by the method of this invention and which are useful in hydrocyanations as described in U.S. patent application 168,352, filed Aug. 2, 1971 by C. M. King, W. C. Seidel and C. A. Tolman are those of the formulae $Ni(PZ_3)_3R^2$—CN and $Ni(PZ_3)_2A$ wherein Z is OR and R is an aryl radical having up to 18 carbon atoms and the groups are so chosen that the ligand has a cone angle with an average value between 130°–170°, wherein A is an unsaturated organic nitrile containing up to 20 carbon atoms, having one olefinic carbon-carbon double bond and the carbon-carbon double bond is separated from the nitrile group by at least one carbon atom, wherein $R^2$ is of the class consisting of 2-butenyl, 3-butenyl and cyano substituted butyl radicals. The cone angle is measured as described by C. A. Tolman, *J. Am. Chem. Soc.*, 92, 2956 (1970). Typical trivalent phosphorus ester ligands of this type include tri-$o$-tolylphosphite (cone angle 141°) and tri(2,5-xylyl)phosphite (cone angle 144°). Typical corresponding zerovalent nickel complexes include $Ni[P(O\text{-}o\text{-}C_6H_4CH_3)_3]_3[NC-CH_2-CH=CH-CH_3]$,
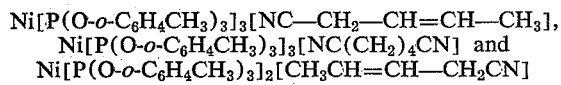
$Ni[P(O\text{-}o\text{-}C_6H_4CH_3)_3]_3[NC(CH_2)_4CN]$ and
$Ni[P(O\text{-}o\text{-}C_6H_4CH_3)_3]_2[CH_3CH=CH-CH_2CN]$ The organic nitrile solvents employed in the preparative method of this invention can be mononitriles or dinitriles and include such nitriles as 3-pentenenitrile, 4-pentenenitrile, adiponitrile, methylglutaronitrile and ethyl succinonitrile. Of these, 3-pentenenitrile and adiponitrile are preferred. In general, at least about 5 moles of nitrile solvent per mole of nickel chloride is employed; amounts up to 1000 moles or more based on nickel chloride can be used; generally amounts ranging from about 20 to about 100 moles are preferred.

Either nickel chloride or its hydrate can be used as the source of nickel, as is illustrated in the examples. The zinc halide used in the solubilization of nickel chloride can be zinc chloride, zinc bromide or zinc iodide, with zinc chloride being preferred. As noted above, the mole ratio of zinc halide, based on the amount of nickel chloride to be dissolved, should be at least 2. Amounts in excess of this can be used but no particular advantage appears to be gained in using more than that corresponding to a mole ratio of about 3.

For the preparation of zerovalent complexes the amount of the triaryl phosphite $PZ_3$, should provide a mole ratio at least as great as the mole ratio of $PZ_3$ to nickel in the desired complex. The triaryl phosphite can be introduced in the solubilizing step or immediately prior to or along with the reducing metal in the reduction step.

Operable reducing metals are those which are more electropositive than nickel in the organic nitrile containing the triaryl phosphite, that is, they have a greater tendency to give up electrons in this solvent system than does nickel. Useful metals include Na, Li, Mg, Ca, Ba, Sr, Ti, V, Fe, Co, Cu, Zn, Cd, Al, Ga, In, Sn, Pb and Th. Among these, Zn is preferred. The reducing metal should be clean and in finely-divided form. Finely-divided metal such as zinc which will pass through about a 50 mesh size screen is particularly suitable. Normally, at least a stoichiometric amount of the reducing metal will be used, based on the amount of nickel to be reduced.

The reactions described above can be carried out at pressures in the range of 0.05 to 100 atmospheres; a range of 0.05 to 10 atmospheres, and more particularly, at atmospheric pressure is preferred. The time required to carry out the reactions will vary depending primarily on the temperature used. The solubilization of the nickel halide can generally be accomplished in 1–3 hours depending on the temperature employed. In general, solubilization of nickel chloride in a given charge will be carried to substantial completion following which the dissolved nickel chloride will be contacted with the reducing metal. In some cases, particularly in large scale preparations, it may be desirable to interrupt the solubilization step before all of the nickel chloride has been dissolved and to proceed with the reduction of the nickel compound. The reduction step as well as the solubilization step can be carried out in the same vessel, or the dissolved nickel chloride can be transferred from the dissolving vessel to another vessel for the reduction step. As indicated above, for the solubilization of the nickel compound the essential requirement is that it be contacted with the reactant mixture consisting of an organic nitrile and a zinc halide. The triaryl phosphite can also be introduced with the organic nitrile and zinc halide or after the solubilization step but prior to or along with the addition of the reducing metal.

The zerovalent nickel complexes that can be prepared by the process of this invention are useful in the hydrocyanation of olefinic compounds, as is known in the art.

DESCRIPTION OF PREFERRED EMBODIMENTS

The preferred embodiments of this invention are illustrated in the examples to follow. As noted above, the mole ratio of the zinc halide solubilizing agent with respect to the nickel compound to be dissolved should be at least 2. Good results are obtained in a range of 2–3.

In the examples to be described below the reactions were carried out in an inert atmosphere such as nitrogen in a 300 ml. flask fitted with magnetic stirrer, condenser and thermometer. The apparatus was first purged with dry nitrogen and the reactants under a nitrogen blanket were charged to the flask and continued under nitrogen during reaction. The liquid reaction products were recovered from the flask under vacuum through a Büchner funnel attached to the bottom of the flask and analyzed for elemental nickel and for zerovalent nickel. Elemental nickel can be determined by dissolving the sample in aqueous solvent after fusion with potassium pyrosulfate or by dissolving the sample directly in methanol and thereafter determining nickel by atomic absorption spectroscopy. The zeorvalent nickel can be determined as described by C. A. Tolman, *J. Am. Chem. Soc.*, 92, 2956 (1970).

EXAMPLE 1

Preparation of Nickel Complex—Type $Ni(PZ_3)_4$ (a) Solubilization of $NiCl_2$.—The reaction system was thoroughly purged with dry nitrogen, the reaction flask was warmed with a hot air heater and dry nitrogen again passed through the reactor system to remove traces of water vapor. Under dry nitrogen, anhydrous $NiCl_2$ (2.63 g.) and the amounts of $ZnCl_2$, mixed m- and p-tritolyl phosphite (m- and p-TTP) and 3-pentenenitrile (3-PN) shown in the following table were charged to the reactor. The reaction mixture was rapidly heated to 110° C. with a hot air heater and maintained at that temperature with stirring under nitrogen atmosphere for the times indicated following which the reaction mixture was cooled to 50° C. and the liquid product withdrawn and analyzed for conversion to soluble nickel. The results are tabulated below.

SOLUBILIZATION OF NICKEL COMPOUNDS

| Exp. | $ZnCl_2$ (g.) | $ZnCl_2/NiCl_2$ | m- and p-TTP (g.) | 3-PN (g.) | Temp. (° C.) | Time | Conversion (percent) |
|---|---|---|---|---|---|---|---|
| 1 | 5.6 | 2 | 60 | 60 | 110 | 2 hours | 79.5 |
| 2 | 5.6 | 2 | 60 | 60 | 110 | 1 hour | 70.9 |
| 3 | 8.4 | 3.1 | 60 | 60 | 110 | 2 hours | 92.9 |
| 4 | 1.2 | 0.4 | 60 | 60 | 25 | 34 days | 5.0 |
| 5 | 8.4 | 3.1 | 60 | 60 | 110 | 1 hour | 86.5 |
| 6 | 2.8 | 1 | 60 | 60 | 110 | do | 39.9 |
| 7 | None | | 60 | 60 | 110 | 2 hours | 0.01 |
| 8 | 0.2 | 0.7 | 60 | 60 | 110 | do | 3.1 |
| 9 | 2.8 | 1 | None | 120 | 110 | do | 56.3 |
| 10 | 2.8 | 1 | 120 | None | 110 | do | 0.01 |
| 11 | 5.6 | 2 | None | 120 | 110 | do | 97.3 |
| 12 | 8.4 | 3.1 | None | 120 | 110 | do | Quantitative |
| 13 | None | | None | 120 | 110 | do | 0.01 |

The critical requirements as to $ZnCl_2$ and 3-PN are shown in Experiments 7, 8, 10 and 13. As is apparent, solubilization of nickel chloride can be realized at a zinc chloride/nickel chloride mole ratio below 2, but the overall conversion is correspondingly lower.

(b) Reduction of solubilized nickel compound.—A combined solution (129.74 g.) comprising portions of the solubilized reaction products of Step (a), Experiments 1 and 2 and containing 0.72 weight percent (0.016 mole) of soluble nickel compound, 1.89 weight percent of zinc salt, 43.7 weight percent of mixed m- and p-TTP and 48.1 weight percent of 3-PN were charged to the reaction flask under nitrogen. The solution was heated to 90° C. and 1.14 g. (0.017 mole) of zinc dust was introduced. The mixture was heated with stirring to 110° C. in about two minutes with a hot air heater. Ten minutes after addition of the zinc powder a sample was removed from the reactor, cooled rapidly in ice water to prevent further reaction and analyzed. The sample contained 0.56 weight percent of zerovalent nickel which corresponds to a conversion of $Ni^{+2}$ to $Ni°$ of 78.5%. A sample taken after 120 minutes contained 0.58 weight percent of Ni° which corresponds to a conversion of 80.6%. The complex corresponds to $Ni[P(O\text{-}m \text{ and } p\text{-}C_6H_4CH_3)_3]_4$.

EXAMPLE 2

A solution of nickel chloride in 3-PN was prepared by adding under a nitrogen blanket 31.5 g. of $NiCl_2·6H_2O$ to a stirred solution of 36.15 g. of anhydrous zinc chloride (2/1 mole ratio vs. Ni) in 300 ml. of 3-PN held at 70° C. in a reaction flask fitted with a 20 plate Oldershaw column. Solution was quickly effected after which water of hydration (14.5 ml.) was taken off at 200 torr along with about 100 ml. of 3-PN.

Thereafter a 3/1 molar ratio of tri-ortho-tolyl phosphite and a molar equivalent of zinc dust based on amount of nickel chloride were introduced. At 70° C. approximately 80% of the nickel chloride had been converted to the zerovalent complex in five minutes. In a similar run carried out at 60° C., a similar conversion level was reached in 20 minutes. The complex corresponds to $$Ni[P(O\text{-}o\text{-}C_6H_4CH_3)_3]_3[NC\text{---}CH_2CH=CH\text{---}CH_3]$$

and $Ni[P(O\text{-}o\text{-}C_6H_4CH_3)_3]_2[CH_3CH=CH\text{---}CH_2CN]$.

What is claimed is:

1. A process for preparing a zerovalent complex of nickel with an organic phosphorus compound of the formula $PZ_3$ wherein Z is OR and R is a hydrocarbyl aryl radical having up to 18 carbon atoms which comprises (a) contacting nickel chloride with a reactant mixture consisting essentially of an organic nitrile of the group consisting of 3-pentenenitrile, 4-pentenenitrile, adiponitrile, methylglutaronitrile, and ethylsuccinonitrile and a zinc halide of the group consisting of zinc chloride, zinc bromide and zinc iodide, the zinc halide being present in an amount to provide a mole ratio of zinc halide with respect to nickel chloride to be dissolved of at least 2, and agitating the resulting mixture at a temperature in the range of 25–140° C. to effect a desired degree of solution of nickel chloride in the reactant mixture and (b) thereafter contacting the dissolved nickel chloride with the organic phosphorus compound $PZ_3$ and a finely-divided reducing metal which is more electropositive than nickel in the reactant mixture containing $PZ_3$ and maintaining the reactant mixture at a temperature in the range of 60–115° C. to produce the zerovalent nickel complex of $PZ_3$.

2. The process of Claim 1 wherein Step (a) is carried out at a temperature in the range of 70–140° C.

3. The process of Claim 2 wherein the organic phosphorus compound $PZ_3$ is introduced into the reactor in Step (a) along with the organic nitrile, the nickel compound and the zinc halide.

4. The process of Claim 3 wherein the zinc halide is zinc chloride.

5. The process of Claim 1 wherein the zerovalent complex of nickel has the formula $NiL_4$ wherein L is a sigma pi bonding neutral ligand represented by $PZ_3$ wherein Z is defined as in Claim 1.

6. The process of Claim 1 wherein the zerovalent complex of nickel has the formula $NiL_4$ wherein L is a sigma pi bonding neutral ligand represented by $PZ_3$ wherein Z is defined as in Claim 1.

7. The process of Claim 5 wherein the organic nitrile is 3-pentenenitrile, $PZ_3$ is $P(O\text{-}m$ and $p\text{-}C_6H_4CH_3)_3$ and the zerovalent nickel complex produced is $Ni[P(O\text{-}m$ and $p\text{-}C_6H_4CH_3)_3]_4$.

8. The process of Claim 6 wherein the organic nitrile is 3-pentenenitrile, $PZ_3$ is $P(O\text{-}m$ and $p\text{-}C_6H_4CH_3)_3$ and the zerovalent nickel complex produced is $Ni[P(O\text{-}m$ and $p\text{-}C_6H_4CH_3)_3]_4$.

9. A process for preparing a zerovalent complex of nickel with an organic phosphorus compound of the formula $PZ_3$ wherein Z is OR and R is a hydrocarbyl aryl radical having up to 18 carbon atoms which comprises (a) contacting nickel chloride with a reactant mixture consisting essentially of an organic nitrile of the group consisting of 3-pentene-nitrile, 4-pentene-nitrile, adiponitrile, methylglutaronitrile, and ethylsuccinonitrile and a zinc halide of the group consisting of zinc chloride, zinc bromide and zinc iodide, the zinc halide being present in an amount to provide a mole ratio of zinc halide with respect to nickel chloride to be dissolved of at least 2, and agitating the resulting mixture at a temperature in the range of 25–140° C. to effect a desired degree of solution of nickel chloride in the reactant mixture and (b) thereafter contacting the dissolved nickel chloride with the organic phosphorus compound $PZ_3$ wherein R is chosen so that $PZ_3$ has a cone angle with an average value between 130° and 170° and a finely-divided reducing metal which is more electropositive than nickel in the reactant mixture containing $PZ_3$ and maintaining the reactant mixture at a temperature in the range of 60–115° C. to produce the zerovalent nickel complex of the formula $Ni(PZ_3)_3R^2\text{---}CN$ and $Ni(PZ_3)_2A$ wherein $R_2$ is of the class consisting of 2-butenyl, 3-butenyl and cyano substituted butyl radicals and A is 3-pentenenitrile or 4-pentenenitrile.

10. The process of Claim 9 wherein the zinc halide is zinc chloride.

11. The process of Claim 9 wherein the organic nitrile is 3-pentenenitrile, $PZ_3$ is $P(O\text{-}o\text{-}C_6H_4CH_3)_3$ and the zerovalent nickel complexes produced are $Ni[P(O\text{-}o\text{-}C_6H_4CH_3)_3]_3[NC\text{---}CH_2\text{---}CH=CH\text{---}CH_3]$ and $Ni[P(O\text{-}o\text{-}C_6H_4H_3)_3]_2[CH_3CH=CH\text{---}CH_2CN]$.

12. The process of Claim 10 wherein the organic nitrile is 3-pentenenitrile, $PZ_3$ is $(P(O\text{-}o\text{-}C_6H_4CH_3)_3$ and the zerovalent nickel complexes produced are $Ni[P(O\text{-}o\text{-}C_6H_4CH_3)_3]_3[NC\text{---}CH_2\text{---}CH=CH\text{---}CH_3]$ and $Ni[P(O\text{-}o\text{-}C_6H_4H_3)_3]_2[CH_3CH=CH\text{---}CH_2CN]$.

References Cited

UNITED STATES PATENTS

| | | | |
|---|---|---|---|
| 3,346,608 | 10/1967 | Von Kutepow et al. | 260—439 R |
| 3,390,195 | 6/1968 | Chappell et al. | 260—439 R |
| 3,536,748 | 10/1970 | Drinkard et al. | 260—439 R |
| 3,538,142 | 11/1970 | Drinkard et al. | 260—439 R |
| 3,631,191 | 12/1971 | Kane et al. | 260—439 R |

DANIEL E. WYMAN, Primary Examiner

A. P. DEMERS, Assistant Examiner

U.S. Cl. X.R.

252—431 N, 431 P; 260—465.3

PO-1050
(5/69)

UNITED STATES PATENT OFFICE
CERTIFICATE OF CORRECTION

Patent No. __3,847,959__    Dated __Nov. 12, 1974__

Inventor(s) __Howard E. Shook, Jr. and John B. Thompson__

It is certified that error appears in the above-identified patent and that said Letters Patent are hereby corrected as shown below:

Column 5, line 41, the claim reference numeral "1" should read --4--.

Column 6, lines 32 and 37, that portion of the formula reading "$(O-o-C_6H_4H_3)$" should read --$(O-o-C_6H_4CH_3)$--.

Signed and sealed this 11th day of February 1975.

(SEAL)
Attest:

RUTH C. MASON
Attesting Officer

C. MARSHALL DANN
Commissioner of Patents
and Trademarks